INVENTORS K. DRANSFELD
R. KOMPFNER
P. K. TIEN
BY Harry C. Hart
ATTORNEY

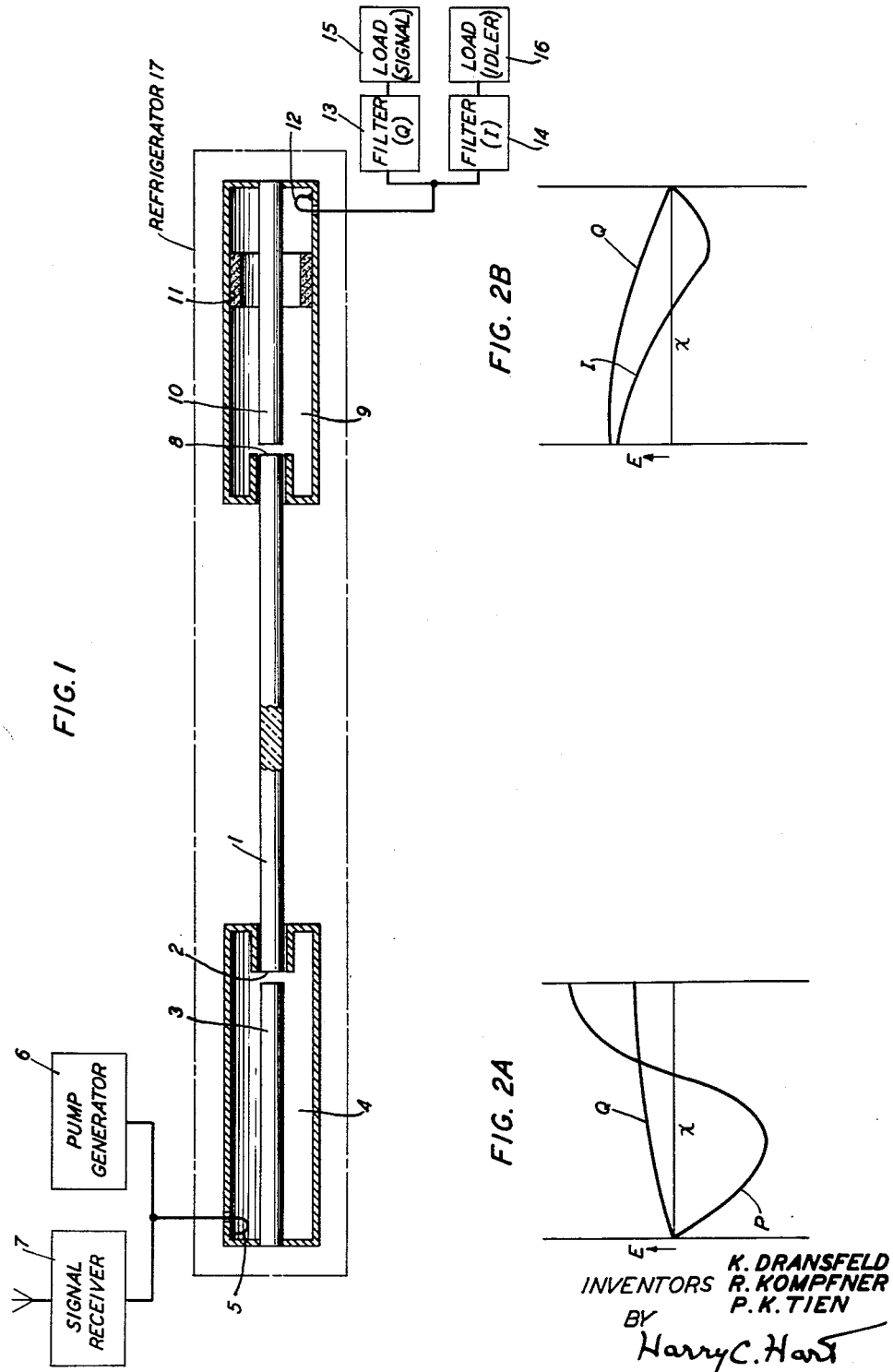

United States Patent Office 3,012,204
Patented Dec. 5, 1961

3,012,204
ELASTIC WAVE PARAMETRIC AMPLIFIER
Klaus Dransfeld, Princeton, Rudolf Kompfner, Middletown, and Ping K. Tien, Chatham Township, Morris County, N.J., assignors to Bell Telephone Laboratories, Incorporated, New York, N.Y., a corporation of New York
Filed Apr. 15, 1959, Ser. No. 806,716
4 Claims. (Cl. 330—5)

This invention deals with elastic materials and with the vibratory behavior of such materials. It has for its principal object the amplification of vibrations, especially vibrations that are representative of an information-bearing signal wave received from a distant point and over whose energy and frequency the operator has no control.

In particular, the amplification of an information-bearing vibratory wave of one frequency is accomplished by the transfer to it of energy abstracted from a locally generated wave of different frequency and over which the operator has full control, both of its frequency and of its energy. The energy transfer is caused to take place, advantageously, in the course of the progress together, from one point of an elastic wave-supporting medium to another, of the information-bearing vibratory wave, termed the signal wave, and a locally generated vibratory wave of different frequency, termed a pump wave.

The velocity with which a disturbance spreads within a body of elastic material from a point at which it is initiated to another point at which it manifests itself is equal, in every case, to the square root of the quotient of an elastic factor of the material divided by its density. Thus, for a plane compression wave in a thin rod of a material such as steel or quartz, $$c^2 = \frac{E}{\rho} \tag{1}$$

where $c$ is the velocity of wave propagation,
$E$ is Young's modulus in its static form, and
$\rho$ is the density.

In a thick rod, i.e., one whose transverse dimensions are large compared with the length of the compression wave, the elastic modulus appears in its dynamic form $E'$, as discussed below, and (1) becomes $$c^2 = \frac{E'}{\rho} \tag{1a}$$

Similarly, for a transverse shear wave, $$c^2 = \frac{\mu}{\rho} \tag{2}$$

where $\mu$ is the shear modulus of the material of the rod.

These expressions show that the propagation velocity is dependent on the density of the wave-supporting medium, and hence that, when a density variation wave travels through the medium, the wave propagation velocity varies accordingly. For many practical purposes, these variations are insignificant, and it is customary to disregard them, treating the wave propagation velocity as constant and equal to its mean value, $c_0$.

In contrast, the present invention turns the variations of wave propagation velocity in an elastic medium to account in the construction of a wave amplifier. It is based on the recognition that these variations become significant when the amplitude of a traveling compression or shear wave is large, and that the relations expressed by Equations 1, 1a and 2 are nonlinear. Its operation is based on an interaction that takes place within an elastic medium and stems from this nonlinearity, between two components of a traveling elastic wave of pump frequency P and signal frequency Q, respectively, P being greater than Q, to form a modulation product of the difference or "idler" frequency $P-Q$ which, by virtue of considerations more fully discussed below, is regenerative with respect to the signal frequency Q, so that the signal wave grows as it travels. To this extent the invention embodies the principles of parametric amplification.

If care be not exercised to prevent it, gain achieved in any fashion may be offset by dissipative losses. Especially at the very high frequencies, i.e., in the range of $10^8$–$10^{11}$ cycles per second at which the amplifier of the invention is of special utility, compression and torsion waves in a rod of a material such as steel, quartz, or the like are rapidly dissipated at ordinary temperatures. It has been found, however, that such dissipation falls off substantially at temperatures of 20° K. and below. Advantageously, therefore, the apparatus is refrigerated, in operation, to whatever temperature may be necessary to reduce the dissipative losses to tolerable proportions. Just what this temperature is depends, of course, on the material of the elastic body.

Additionally, parametric gain achieved in the fashion of the invention may be offset by nondissipative losses that are attributable to the transfer of energy from the signal wave to a sum frequency $(P+Q)$ modulation product of the pump wave with the signal wave. It is advantageous, therefore, either to balance out the effects of such undesired modulation products or to suppress them.

It has been found that at a temperature slightly higher than that at which the dissipative losses are negligible, and at which dissipation begins to be noticeable, such dissipation is highly dependent on frequency, being several times as great for any selected frequency as it is for one half that frequency. With a frequency ratio of 3 to 1 or so as between the pump frequency and the signal frequency, the idler frequency $P-Q$ is twice the signal frequency and the sum frequency $P+Q$ is four times the signal frequency. Hence, with any such frequency distribution, the sum frequency component, when operation is at the knee of the temperature-dissipation curve, is dissipated more than twice as fast as the idler. This effect may be utilized to prevent sum frequency components from growing, while allowing the (lower) idler frequency components to grow. While helpful, this is not essential in a wide band system for the reason that, when a large number of sum and idler frequency components are simultaneously present, the net gain due to all the idlers exceeds the net loss due to all the sum frequency components. This gain-loss balance will be discussed more fully below.

The invention will be fully apprehended from the following description of an illustrative embodiment thereof taken in connection with the appended drawings in which:

FIG. 1 is a schematic diagram showing an amplifier embodying the invention;

FIGS. 2A and 2B are diagrams of assistance in explaining the operations of launching the required waves into an elastic medium and in recovering other waves from the medium;

Figure 3A:
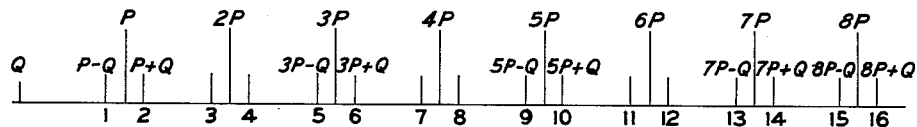
FIGS. 3A and 3B are diagrams of assistance in explaining the principle of parametric amplification.

Referring now to the drawings, FIG. 1 shows an amplifier of which the principal component is a rod 1 of elastic material. For frequencies in the range of principal interest, namely the very high frequencies of the order of 1,000 megacycles per second and higher, the rod 1 may have a cross-section, e.g., square or circular, of about ¼ cm.², while its length may be of the order of twenty-five centimeters or more. Provision is made for launching, into the left-hand end of the rod 1, an elastic wave having components of pump frequency P and signal frequency Q, the former, at least, being of substantial amplitude, and for withdrawing an amplified signal wave of frequency Q from its right-hand end.

At moderate or low frequencies at which the vibration wavelength within the rod 1 is of the order of one millimeter or more, the launching into the left-hand end and the recovery from the right-hand end may be effected through piezoelectric crystals, one half wavelength in thickness, one attached to each end of the rod. In such case any elastic material having low disipation serves for the rod as well as any other. Steel, glass, brass are examples.

At the very high frequencies for which the amplifier is of particular interest, the launching of the waves into such a rod and the recovery of waves therefrom presents a problem inasmuch as the thickness of a half wavelength piezoelectric crystal is so minute as to present serious difficulties of fabrication. These difficulties are conveniently overcome by endowing the wave-supporting rod 1 itself with piezoelectric properties as well as elastic properties. A suitable material having properties of both kinds is quartz. Accordingly, the wave-supporting rod 1 itself may advantageously be of quartz, and preferably a single crystal of quartz. For longitudinal waves, the rod may be cut from this crystal with its longitudinal axis parallel to the "X" crystallographic axis of the crystal. Alternatively, if it is to support traveling transverse or shear waves, the rod may be cut from the crystal in accordance with the well known AC- or BC-cut.

With an elastic rod 1 of piezoelectric material, waves may be launched into it by the mere application of an electric field to its end face. Thus, in the illustration of FIG. 1 the left-hand end 2 of the rod 1 is juxtaposed with the end face of a metal stub 3 which constitutes the inner conductor of a coaxial cavity resonator 4, the stub 3 is conductively fixed to the inside wall of the left-hand end of this cavity resonator and terminates short of the right-hand end. With this construction the electric field strength is zero at the left-hand end of the resonator 4 and reaches a maximum value at the right-hand end of the stub 3 so that a strong electric field may be applied across the gap between the stub 3 and the juxtaposed end face 2 of the quartz rod 1. This construction serves equally well to launch longitudinal waves into an X-cut rod or transverse waves into an AC-cut or a BC-cut rod.

In accordance with the invention this field comprises two different components, the frequency of the higher one, designated the pump, being P and the frequency of the lower one, normally the signal, being designated Q. A convenient way in which to provide for resonance in the cavity 4 at these two different frequencies is to arrange that P shall be three times Q, in which case the cavity 4 may support one fourth of a wavelength at the frequency Q and three fourths of a wavelength at the frequency P. As indicated in FIG. 2A, the electric field strengths E for P and Q both attain zero values at the left-hand end of the cavity 4 where the stub 3 is connected to the inside walls and attain maximum values at the right-hand end.

In a cavity resonator of such construction the magnetic field has a circular configuration, concentric with the stub, and reaches a maximum value where the electric field E is null. Hence both components P and Q may conveniently be introduced into the cavity by way of a single coupling loop 5, jointly energized by a local pump generator 6 of frequency P and a receiver 7 of signal waves of frequency Q.

The composite wave thus generated, after being launched into the elastic rod 1 through the agency of its piezoelectric properties, travels along the rod to its right-hand end. During the course of the travel, interactions take place between the two components of the wave, giving rise to the generation of an idler wave of frequency P−Q and to the exponential growth both of the signal wave and of the idler wave in the course of their travel. This growth is at the expense of the power, and hence the amplitude, of the pump wave which, therefore, in contrast to growing, decays as it travels.

Upon reaching the right-hand end 8 of the rod 1 the signal wave, or in any event a substantial fraction of it, is abstracted from the rod and delivered to a second cavity resonator 9 whose construction, in the main, may be the same as that of the input cavity resonator 4. Signal wave energy is abstracted from the rod 1 by virtue of the inverse piezoelectric effect and delivered to the electric field E that appears between the right-hand end 8 of the piezoelectric rod and the juxtaposed end of the stub 10 of the output cavity resonator 9. To abstract a maximum of signal frequency power the resonator 9 should be so proportioned as to present to the elastic rod 1 an impedance which matches the characteristic mechanical impedance of the rod as nearly as possible at the signal frequency Q. The idler frequency wave may also be withdrawn from the rod 1 into the output cavity resonator 9. With an unloaded cavity resonator, the length of the idler wave is twice that of the signal wave and hence, if the length of the cavity resonator 9 is one fourth of the signal wavelength, it is one half the idler wavelength. This situation makes for a substantial mismatch between the rod 1 and the cavity resonator 9 at the idler frequency. To obviate this, the cavity resonator 9 may be loaded with a dielectric or a ferromagnetic phase modifier 11. By appropriate location of this element in accordance with principles well known in the cavity resonator art, the idler wave may be substantially shortened in such a fashion that, as shown in FIG. 2B, the cavity resonator 9 is approximately three fourths of the idler wavelength as thus modified. A sufficiently good impedance match is thus provided between the rod 1 and the cavity resonator 9 at the idler frequency. The same phase modifier 11 also shortens the wavelength of the pump frequency field in the output cavity resonator so that a full wavelength of the pump field as thus modified now occupies the full length of the resonator. Thus the impedance match between the elastic rod 1 and the output cavity resonator 9 is poor at the pump frequency so that the major part of the pump frequency energy is reflected back within the rod 1 from its output end 8 to its input end 2. Such reflection serves to conserve pumping power. The reflected wave combines with the pump frequency component of the input wave in a phase relation dependent on the pump frequency and the length of the rod 1. For a given rod length this combination may be arranged, by precise adjustment of the frequency of the pump generator, to be additive.

Signal frequency energy is withdrawn from the output cavity resonator 9 and applied to a load in any desired fashion, for example, through a coupling loop 12 disposed in a position to be threaded by the magnetic field of the signal wave in the cavity resonator 9 and at or close to the end of the rod 1 where the desired magnetic fields reach their maximum values. Because, after the interaction between the wave components in the rod has taken place over a substantial length, the idler wave contains nearly as much energy as the amplified signal wave the idler wave, if desired, may be withdrawn along with, or instead of, the signal wave. Information-carrying modulations present in the original signal wave are reproduced in the idler wave. Hence it is matter of choice which one of these two waves is to be extracted from the output cavity resonator 9 and applied, by way of a filter 13 or 14 to a load 15 or 16. If a frequency-changing operation is desired, in addition to amplification, the idler wave is to be preferred to the signal wave.

Figure 4:
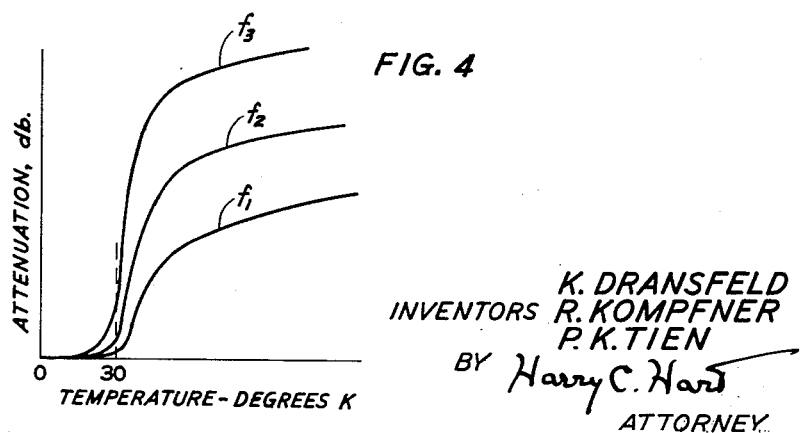
FIG. 4 is a set of temperature-attenuation curves for longitudinal waves in an X-cut quartz crystal rod.

The entire apparatus is advantageously placed, for operation, in a refrigerator 17. If reliance is placed on frequency-dependent dissipation to prevent sum frequency losses from offsetting idler frequency gains, the refrigerator 17 may be maintained at the knee of the temperature-dissipation curve, i.e., as shown in FIG. 4, at 25° K. for longitudinal waves in an X-cut crystal of quartz. The same temperature-dissipation curves are shown in greater detail in a monograph by H. E. Bommel and K. Dransfeld, to be published in the Physical Review Letters. If the sum frequency losses are otherwise controlled, the apparatus may advantageously be cooled to a lower temperature at which dissipative losses in the quarts nearly disappear. By further cooling to 4° K., the walls of the cavity resonators 4, 9 become superconductive. This virtually eliminates electrical losses from the associated driver and recovery circuits.

Of the classical laws of physics, one of the best known is Hooke's Law which states that stress is proportional to strain. For infinitesimal changes of stress and strain, this law is exact; and for finite changes of sufficiently small magnitude it is so nearly exact that its departures from exactness can be safely disregarded. Moreover, it is, for practical purposes, exact when the elastic behavior of the body of a material is compounded, or extended, by geometrical devices, as in the case of a coiled spring. It is a fact, however, that Hooke's Law fails to hold for large changes of stress and strain; and this fact, though well established, is sometimes overlooked. The matter is fully discussed in the literature of physics, for example, in the Handbook of Physics by E. U. Condon and H. Odishaw (McGraw-Hill, 1958) Part 3, especially chapters 1, 5 and 7. It is there shown that the relation between the strain of any elastic body and the stress to which it is subjected is indeed a nonlinear one.

The invention turns to account the departures of elastic materials from the proportional relation of Hooke's Law. The manner in which it does so will be best understood from the following considerations.

Returning to Equations 1 and 2, these expressions can be verified by reference to standard texts dealing with waves and vibrations. For example, Rayleigh, in his "Theory of Sound," vol. 1, page 245 (Dover, 1945) gives for compression waves $$c^2 = \frac{E}{\rho} \quad (1)$$

where E is Young's modulus in its static form. This equation is for the case in which the lateral dimensions are small compared with the vibration wavelength. When, to the contrary, the wavelength is short compared with the lateral dimensions of the rod, the static modulus E must be replaced by the dynamic modulus E′, as in Equation 1a. The relation between these moduli is given in various ways by various writers. Thus L. Bergmann, in "der Ultraschall" (Hirzel, Zurich, 1954, 6th ed.), of which the first edition is available in English translation, gives (page 560)

$$E' = E \frac{1-\sigma}{(1+\sigma)(1-2\sigma)} \quad (2)$$

where δ is Poisson's ratio for the material.

In the Handbook of Physics (McGraw-Hill, 1958), Condon and Odishaw give (Part 3, page 99)

$$E' = \lambda + 2\mu$$

where
 λ is Lamé's elastic modulus and
 μ is the modulus of rigidity. Either form may readily be converted into the other with the aid of the relations given on page 69 of chapter 3 of the Handbook.

Having in mind that the elastic modulus to be employed in Equation 1 or 1a is Young's modulus in its static form (1) or its dynamic form (1a) according as the vibration wavelength is long or short compared with the lateral dimensions of the wave-supporting body, Equation 1a may be regarded as a special case of Equation 1. Accordingly, they are treated below as equivalent, the prime being omitted.

The formula of Equation 2, for the propagation velocity of transverse waves, is given in identical form by Rayleigh on page 261 of the text cited and on page 99 of chapter 3 of the handbook.

These expressions fall, in each case, out of the differential wave equation which is arrived at by considering the forces that act, at each moment, on each elementary mass element of the rod. Hence Young's modulus, in its static form E in Equation 1 or its dynamic form E′ in Equation 1a and the modulus or rigidity μ in Equation 2, are the local and momentary moduli, while the density ρ in both equations is the local and momentary density. In most practical cases these quantities depart only minutely from their average values and hence, in such cases, the error introduced by substituting for these quantities their average values, which are constant both from time to time and from point to point, is negligible. It is therefore the usual practice to treat the velocity of propagation c of a compression wave or of a shear wave in an elastic body as constant; i.e., as having the value $c_0$ always and everywhere.

The truth is, however, that the propagation velocity c is not constant and that its departure from constancy is proportional to the wave amplitude and becomes significant for waves of large amplitude. Thus, for example, taking the logarithm of both sides of Equation 1, or 1a, $$2 \log c = \log E - \log \rho \quad (3)$$

from which, by differentiation, $$\frac{dc}{c} = \frac{1}{2}\left(\frac{dE}{E} - \frac{d\rho}{\rho}\right) \quad (4)$$

In ordinary solids the first term on the right-hand side of (3) is usually five times as great as the second term so that, approximately, $$\frac{dc}{c} \doteq 2\frac{d\rho}{\rho} \quad (5)$$

Departures of the constant of proportionality from the magnitude 2 are nowadays taken care of by writing, more generally, $$\frac{dc}{c} = \gamma \frac{d\rho}{\rho} \quad (6)$$

where γ is Gruneisen's constant. This factor is discussed by Slater in his "Introduction to Chemical Physics."

Similarly, treating Equation 2 in the same way, the proportional change of wave propagation velocity for a transverse wave in a rod is readily found to be $$\frac{dc}{c} = \frac{1}{2}\left(\frac{d\mu}{\mu} - \frac{d\rho}{\rho}\right) \quad (7)$$

As before, the proportional change $$\frac{d\mu}{\mu}$$

of the shear modulus μ is found to be several times greater than the proportional change $$\frac{d\rho}{\rho}$$

of the density, and hence Equation 7 may be shortened to $$\frac{dc}{c} = \gamma'\frac{d\rho}{\rho} \quad (8)$$

where γ′ is a constant, analogous to Gruneisen's constant, relating the proportional change of wave velocity to the proportional change in the density of the wave-supporting medium.

The relations expressed in the foregoing equations are of the class termed "nonlinear." It follows that when a wave, longitudinal or transverse, and having components of two different frequencies P and Q (P>Q) is launched into a body of a material described by equations such as these, interaction takes place between them by virtue of these nonlinear relations, and various harmonics and modulation products are generated, of frequencies $nP \pm mQ$, where $m$ and $n$ are integers.

In general, each modulation product of higher order is of less amplitude than one of lower order. Because the amplitude of the signal wave, of frequency Q, is normally much less than that of the pump wave of frequency P, all modulation products for which $m$ exceeds unity may safely be neglected, the frequencies of the modulation products of significance being, therefore, P, 2P, 3P . . . $P-Q$, $P+Q$, $2P-Q$, $2P+Q$, $3P-Q$, $3P+Q$, and so on.

Restricting attention, for the present, to the first order difference modulation product of frequency $P-Q$ this, in turn, can interact with the pump wave to produce a second order difference modulation product of frequency $$P-(P-Q)=Q \qquad (9)$$

Thus the second order modulation of the first order difference component with the pump reproduces the signal frequency. Hence the flow of power of this first order difference modulation product can be regenerative with respect to the original signal of frequency Q, provided phase relations are correct.

In a monograph published in the Bell System Technical Journal for July 1936, vol. 15, page 424, R. V. L. Hartley analyzed the behavior of an electric circuit having a time-varying element and showed that the phase relations were indeed such that the flow of power at the difference frequency $P-Q$ resulted in the manifestation of a negative resistance at the frequency Q so that, when wave energy was pumped into the system at frequency P, self-oscillations might result at the frequency Q. Hartley also showed that the contrary was true of the flow of power at the sum frequency $P+Q$.

In a monograph published in the Transactions of the American Institute of Electrical Engineers for December 1946, vol. 65, page 870, J. M. Manley and E. Peterson extended Hartley's analysis to the higher order modulation products in an electrical system having a nonlinear reactive element, showing that the same result is found with side frequencies of any order, namely, that the flow of difference frequency current of any order causes energy to be abstracted from the higher frequency source and delivered to the lower frequency source, thus introducing a negative resistance into the signal path and a positive resistance into the pump path, while the flow of sum frequency current of any order abstracts energy from both paths, thus introducing a positive resistance into each of them. Thus, in particular, the second order difference modulation product, of frequency $2P-Q$, can interact with the second harmonic, 2P, of the pump wave to produce a third order difference modulation product of frequency Q that is likewise regenerative with respect to the signal.

Inasmuch as the propagation velocity of the elastic wave of the invention is a reactive phenomenon as distinguished from a resistive one, the effect of a time variation of this propagation velocity, or of a nonlinear relation holding between it and the density wave itself, is fully comparable, analytically, with the reactive parameter variation in the electrical systems examined by Hartley, Manley and Peterson.

Hence, when a wave, longitudinal or transverse and having a pump component of frequency P and a signal component of frequency Q, is launched into one part of an elastic body, for example into one end of the cylindrical rod 1 of FIG. 1, the amplitude of the wave, or at least of the pump component of the wave, being sufficiently great, a noticeable variation of the wave propagation velocity $c$ takes place in accordance with Equation 6 or Equation 8. This wave then travels along the rod 1 and, due to the nonlinear effects discussed above, modulation products of the two components are formed, along with harmonics of the pump frequency. These interact with one another as the wave progresses, the interaction of each difference frequency modulation product with the corresponding harmonic of the pump frequency being regenerative with respect to the signal. At another part of the body, i.e., at the far end of the rod 1, the signal is withdrawn and it is found to have been amplified. The amplification process requires the generation of the difference frequency wave, termed an idler frequency wave, and the travel of this idler wave along with the signal wave and the pump wave, from the input end of the rod to its output end, where the signal wave is withdrawn and, if desired, the idler wave too, the pump wave being advantageously reflected back from the output end of the rod 1 to its input end for reuse. Its frequency and wavelength are normally under the control of the user, so that the exact proportioning of the rod length presents no problems.

The idler wave having been withdrawn, along with the signal wave, and having grown in magnitude in its progress, it is a matter of choice which of the two is utilized. Filters of well known construction may be employed to separate each from the other.

The most advantageous arrangement is one in which all the sum frequency modulation products are excluded; e.g., the system can support traveling waves of frequencies P, Q and $P-Q$ but not higher ones. However, when it is difficult or impossible to adjust the high frequency cutoff of the system with such precision, and power flows at a sufficiently large number of modulation product frequencies, it is found that each of the difference frequencies, $P-Q$, $2P-Q$, $3P-Q$, etc., by itself contributes parametric gain and that, while losses are contributed by the sum frequencies $P+Q$, $2P+Q$, $3P+Q$, etc., these losses are in certain cases insufficient to offset the parametric gain. Which cases are favorable and which are not will be apparent from what follows.

Figure 3B:
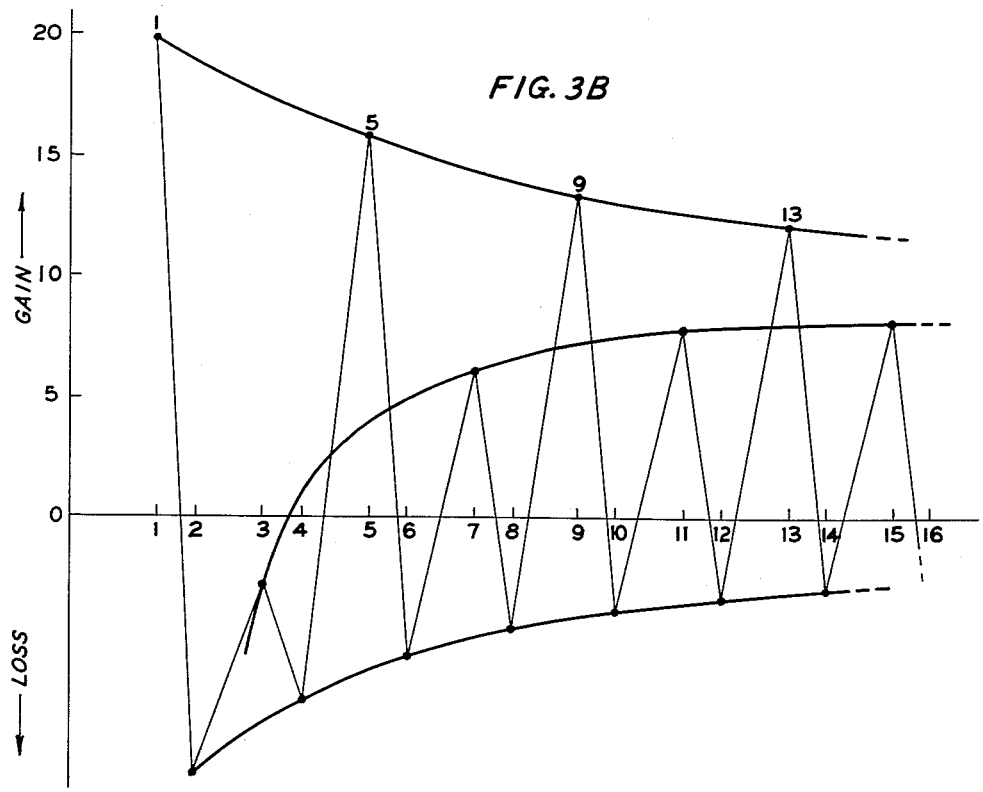

FIG. 3A shows the difference-frequency modulation products or idlers that contribute to parametric gain and the sum frequency products that contribute a loss. To facilitate reference to FIGS. 3A and 3B together, each of these modulation products is numbered. Thus, the idler whose frequency is $4P-Q$ is number 7. FIG. 3B shows the net gain, or loss, as the case may be, with a system of which the passband just includes a particular frequency, all below it and, above it, only the pump frequency harmonic from which it is derived. The figure shows that each of the sum frequency modulation products, $P+Q$, $2P+Q$, etc., contributes loss, and that, for all cases in which the high frequency cutoff of the system lies below the seventh modulation product, these losses more than offset the parametric gains provided by the idlers associated with the even harmonics of the pump frequency. The interesting fact that the losses do not offset the parametric gains provided by the idlers associated with the odd harmonics of the pump frequency is bound up in a complex fashion with the phase relations that obtain among the many components present.

Evidently it is desirable to locate the high frequency cutoff of the system just above the pump frequency or one of its odd harmonics, so as to include $2n-1$ idlers but only $2n-2$ sum frequency products, $n$ being an integer. FIG. 3B shows that as the number of odd harmonics of the pump frequency increases without limit, the net gain is asymptotic to a positive gain of more than one half that obtainable in the most advantageous arrangement, namely, that in which $n=1$.

It is of interest now to establish, analytically, the magnitude of the parametric gain that is obtainable through the agency of the invention.

When the simple wave equation that describes the movement of a plane compression wave in an elastic rod, e.g., Equation 3 of page 245 of Rayleigh, "Theory of Sound," vol. 1 (Dover, 1945) is restated for the wave density variation, traveling in the $z$ direction, that always accompanies a wave of displacement as there given and is rewritten, further, to take account of departures of the wave propagation velocity $c$ from its mean value $c_0$ it becomes $$\frac{\partial^2 \rho_1(z,t)}{\partial z^2} + \frac{\partial^2}{\partial t^2}\left[\frac{1}{c^2(z,t)} \cdot \rho_1(z,t)\right] = 0 \quad (10)$$

where $\rho_1(z,t)$ is the momentary and local deviation of the density $\rho$ from its mean value $\rho_0$.

This equation can be solved following the procedure employed by P. K. Tien and H. Suhl in their monograph "A Traveling Wave Ferromagnetic Amplifier" published in the Proceedings of the Institute of Radio Engineers for April 1958, vol. 46, pages 700-706, in their solution of closely similar equations that describe the behavior of a comparable traveling electromagnetic wave amplifier in which the reactive parameter that is varied is either inductance or capacitance, or both. Stated in complex form the solution, in the present situation, for the signal wave in the presence of the pump wave and the idler wave, and disregarding the sum wave of frequency $P+Q$, is $$\rho_1(z,t) = ae^{\alpha z}i\left(\omega_Q t - \frac{\omega_Q}{c_0}z\right) \quad (11)$$

where $$\alpha = \frac{1}{2}\frac{\Delta c}{c_0}\frac{(\omega_Q \cdot \omega_I)^{1/2}}{c_0} \text{ nepers per cm.} \quad (12)$$

or $$\text{total gain} = \frac{8.686}{2} \cdot \frac{\Delta c}{c_0} \frac{(\omega_Q \cdot \omega_I)^{1/2}}{c_0} L \text{ decibels} \quad (12a)$$

where $\frac{\omega_Q}{2\pi}$ is the signal frequency $Q$ $\frac{\omega_I}{2\pi}$ is the idler frequency $P-Q$ $c_0$ is the mean velocity of elastic propagation,
$\Delta c$ is the deviation of the local and momentary propagation velocity $c$ from this mean, and $L$ is the length of the rod.

Making allowance for the difference between the parameter variations in the system considered by Tien and Suhl in their monograph referred to above and the variations of propagation velocity of interest here, Equation 12 is fully comparable with Equation 23 of page 702 of the Tien-Suhl monograph cited.

Equations 12 and 12a state that the signal wave grows exponentially with distance traveled. The importance of this growth can best be seen from the following example:
In quartz, $\rho \doteq \rho_0 = 2.6$ gm./cc.

$c \doteq c_0 = 5.6 \times 10^5$ cm./sec.

and a conservative figure for the relative density change, $$\frac{\Delta \rho}{\rho}$$

that accompanies a compression wave in a solid rod of crystalline quartz, for which Gruneisen's constant has the magnitude $\gamma = 2$, is $$\frac{\Delta \rho}{\sigma} \doteq 7 \times 10^{-6}$$

whence, from (5), or (6)

$$\frac{\Delta c}{c} \doteq 2\frac{\Delta \rho}{\rho} = 1.5 \times 10^{-5}$$

Taking the signal, idler and pump frequencies as $\frac{\omega_Q}{2\pi} = 1000$ megacycles per second $\frac{\omega_I}{2\pi} = 2000$ megacycles per second $\frac{\omega_P}{2\pi} = 3000$ megacycles per second taking account of the fundamental traveling wave relation between velocity, frequency and wavelength $$c = \frac{\omega \lambda}{2\pi} \quad (13)$$

and that, for a length $L$ of the rod and a number $N$ of full signal frequency wavelengths embraced in it, $$L = N\lambda_q \quad (14)$$

and inserting the foregoing numerical values, Equation 12a reduces to $$\text{Gain} = 8.686\pi \, N \frac{\Delta c}{c_0} \sqrt{\frac{\omega_I}{\omega_Q}} \quad (15)$$

For a signal frequency of 1,000 mc./sec. and a propagation speed of $5.6 \times 10^5$ cm./sec., there are 1,800 signal wavelengths per centimeter of length; and hence with a rod of length $L=28$ cm. or eleven inches, the number $N$ of full signal wavelengths embraced within the rod is $N=5\times10^4$. Inserting these figures into Equation 15 gives, for this case, a signal frequency gain of 30 decibels.

Thus, while the gain per wavelength is low, the gain in a rod of convenient length, such as ten inches, is very considerable because of the large number of wavelengths it embraces.

The source of this gain is ultimately the power delivered to the system by the pump. It is this power which causes the local and momentary wave propagation velocity $c$ to depart significantly from its mean value $c_0$ so that $$\frac{\Delta c}{c}$$

is sufficiently great for the purpose. The power $W$ represented by the pumping wave is given by $$W = \frac{1}{4}\rho_0 c_0^3\left[\frac{\Delta c}{c_0}\right]^2 S \quad (16)$$

where $S$ is the cross-section of the rod. With a rod of 5 mm.$^2$ cross-section, Equation 16 gives, for the power $W = 0.128$ watts It is a simple matter to launch a compression wave of this power into the rod.

While parametric amplification as described above requires that the frequency $P$ of the working pump component within the medium be greater than the frequency $Q$ of the working signal component within the medium, this does not mean that the components actually applied to the medium from external sources satisfy this relation. For, suppose that it is desired to amplify an incoming signal whose frequency $Q_3$ is higher than the frequency $P$ of any available pump generator. It can be applied to the non-linear medium along with the output of the pump generator and, by virtue of the nonlinear properties of the medium, various modulation products of these two input components are generated. One of these has the frequency $$Q_2 = Q_3 - P$$

Modulation of this component, in turn with the pump frequency gives rise, again, to various modulation products, and the frequency of one of these is $$Q_1 = Q_2 - P$$

This arrangement can be repeated as many times as may be necessary to arrive, finally, at a working signal component of frequency $Q_1$ which is less than the pump frequency P. The parametric amplification process then proceeds as described above, with the derived signal frequency $Q_1$ as the working signal. At the output terminals of the apparatus, either by a separate modulation process or by virtue of a reversal of the modulation process described above, the original input signal $Q_3$ may be recovered. This modified mode of operation has already been made public, in connection with electromagnetic parametric amplifiers, in "Parametric Amplification and Frequency Mixing" by P. K. Tien, Journal of Applied Physics for September 1958, vol. 29, page 1347.

The two modulation steps which precede and follow the parametric amplification step, respectively, entail losses; and hence the overall gain that is attainable in this fashion is less than that attainable when the frequency P of the pump is higher than that of the externally applied signal Q, in which event the two modulation steps can be omitted. In principle, however, the parametric gain can more than offset all of the losses entailed by the preliminary and final modulation steps.

What is claimed is:

1. A wave amplifier which comprises a solid elastic body characterized by a nonlinear dependence of the phase velocity of a vibration wave therein on the density thereof, means for launching a vibration wave into one part of said body, said wave having a first large amplitude component of a pump frequency P and a second component of a signal frequency $Q=p/n$, where $n$ is an odd integer, whereupon said vibration wave travels from said first body part to a second part of said body, the length of said body between said first part and said second part being sufficient to embrace a large number of wavelengths at said frequency Q, said nonlinear phase velocity operating to abstract energy from said pump wave, to transfer part of said abstracted energy to said signal wave, to cause the generation of an idler wave of frequency $I=P-Q=(n-1)Q$, and to transfer part of said abstracted energy to said idler wave, said abstraction and transfer taking place over the length of said body from said first part to said second part, whereby said signal and idler waves travel from said first body part to said second body part, growing in amplitude exponentially with distance traveled as they advance, means coupled to said second body part for abstracting the grown wave of one of the frequencies Q, I, said means being proportioned to reflect the wave of frequency P toward said first body part, and means for preventing the growth of unwanted modulation product waves of frequencies greater than P which comprises means for cooling said body to a temperature at which dissipative absorption in said body at all frequencies greater than P offsets any tendency of said unwanted modulation product waves to grow but is insufficient to prevent growth of the waves of the frequencies Q, I.

2. A wave amplifier which comprises a solid elastic rod of piezoelectric material charcterized by a nonlinear dependence of the phase velocity of a vibration wave therein on the density thereof, means for launching into a first end of said rod a vibration wave having a first component of a pump frequency P and a second component of a signal frequency $Q=P/3$, said means including an electromagnetic cavity resonator, electrostatically coupled to an end of said rod and proportioned to support one-quarter of a wave of frequency Q and three-quarters of a wave of frequency P, whereupon said vibration wave travels from said first rod end to the other end of said rod, the length of said rod between said first end and said second end embracing a large integral number of full wavelengths at said frequency P, said nonlinear phase velocity operating to abstract energy from said pump wave, to transfer part of said abstracted energy to said signal wave, to cause the generation of an idler wave of frequency $I=P-Q$ and to transfer part of said abstracted energy to said idler wave, said abstraction and transfer taking place over the length of said rod from said first end to said second end, whereby said signal and idler waves travel from said first rod end to said second rod end, growing in amplitude exponentially with distance traveled as they advance, means coupled to the second end of said rod for abstracting the grown wave of one of the frequencies, Q, I, and for internally reflecting energy of the wave of frequency P toward the first end of the rod, said means including an electromagnetic cavity resonator electrostatically coupled to the second end of said rod and proportioned to support one-quarter of a wave of frequency Q, and a reactive element located within said resonator in the vicinity of a node of said Q frequency wave and operative to shorten the wavelength of a P frequency wave by an amount such that said resonator embraces a full wavelength of said P frequency wave, whereby said resonator simultaneously embraces approximately three-quarters of a wave of said idler frequency, and means for preventing the growth of unwanted modulation product waves in the rod.

3. A wave amplifier which comprises a solid elastic rod of piezoelectric material characterized by a nonlinear dependence of the phase velocity of a vibration wave therein on the density thereof, means for launching into one end of said rod a vibration wave having a first component of a pump frequency P and a second component of a signal frequency $Q=P/n$, where $n$ is an odd whole number, said means including an electromagnetic cavity resonator, electrostatically coupled to an end of said rod and proportioned to support one-quarter of a wave of frequency Q and $n$ quarters of a wave of frequency P, whereupon said vibration wave travels from said first rod end to the other end of said rod, the length of said rod between said first end and said second end embracing a large integral number of full wavelengths at said frequency P, said nonlinear phase velocity operating to abstract energy from said pump wave, to transfer part of said abstracted energy to said signal wave, to cause the generation of an idler wave of frequency $I=P-Q=(n-1)Q$ and to transfer part of said abstracted enregy to said idler wave, said abstraction and transfer taking place over the length of said rod from said first end to said second end, whereby said signal and idler waves travel from said first rod end to said second rod end, growing in amplitude exponentially with distance traveled as they advance, and means coupled to the second end of said rod for abstracting the grown wave of one of the frequencies, Q, I, and for internally reflecting energy of the wave of frequency P toward the first end of the rod, said means including an electromagnetic cavity resonator electrostatically coupled to the second end of said rod and proportioned to support one-quarter of a wave of frequency Q, and a reactive element located within said resonator in the vicinity of a node of said Q frequency wave and operative to shorten the wavelength of a P frequency wave by an amount such that said resonator embraces an integral number of wavelengths of said P frequency wave, whereby said resonator simultaneously embraces a fractional number of wavelengths of said idler frequency wave, and means for preventing the growth of unwanted modulation product waves in the rod.

4. A wave amplifier which comprises a solid elastic rod of piezoelectric material characterized by a nonlinear dependence of the phase velocity of a vibration wave therein on the density thereof, means for launching into one end of said rod a vibration wave having a first component of a pump frequency P and a second component of a signal frequency $Q=P/3$, said means including an electromagnetic cavity resonator, electrostatically coupled to an end of said rod and proportioned to support one-quarter of a wave of frequency Q and three-quarters of a wave of frequency P, whereupon said vibration wave travels from said first rod end to the other end of said rod, the length of said rod between said first end and said second end embracing a large integral number of full wavelengths at said frequency P, said nonlinear phase velocity operating to abstract energy from said pump wave, to transfer part of said abstracted energy to said signal wave, to cause the generation of an idler wave of frequency $I=P-Q=2Q$ and to transfer part of said abstracted energy to said idler wave, said abstraction and transfer taking place over the length of said rod from said first end to said second end, whereby said signal and idler waves travel from said first rod end to said second rod end, growing in amplitude exponentially with distance traveled as they advance, and means coupled to the second end of said rod for abstracting the grown wave of one of the frequencies, Q, I, and for internally reflecting energy of the wave of frequency P toward the first end of said rod, said means including an electromagnetic cavity resonator electrostatically coupled to the second end of said rod and proportioned to support one-quarter of a wave of frequency Q, and a reactive element located within said resonator operative to shorten the wavelength of a P frequency wave by an amount such that said resonator embraces a full wavelength of said P frequency wave, whereby said resonator simultaneously embraces approximately three-quarters of said idler frequency wave, and means for preventing the growth of unwanted modulation product waves of frequencies greater than P which comprises means for cooling said rod to a temperature at which dissipative absorption in said rod at all frequencies greater than P offsets any tendency of said unwanted modulation product waves to grow but is insufficient to prevent growth of waves of the frequencies Q, I.

References Cited in the file of this patent

UNITED STATES PATENTS

| | | |
|---|---|---|
| 2,643,280 | Bernier | June 23, 1953 |
| 2,695,357 | Donley | Nov. 23, 1954 |
| 2,708,237 | Van B. Roberts | May 10, 1955 |
| 2,719,223 | Van der Zeil et al. | Sept. 27, 1955 |

OTHER REFERENCES

Bommel et al.: "Phyiscal Review Letters," Oct. 1, 1958, pages 234–236.

Suhl: "Physical Review," April 15, 1957, pages 384–385.

Landauer: "Journal of Applied Physics," March 1960, pages 479–484.